US007773676B2

(12) United States Patent
Chung

(10) Patent No.: US 7,773,676 B2
(45) Date of Patent: Aug. 10, 2010

(54) VIDEO DECODING SYSTEM WITH EXTERNAL MEMORY REARRANGING ON A FIELD OR FRAMES BASIS

(75) Inventor: Tae Il Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 1144 days.

(21) Appl. No.: 11/072,313

(22) Filed: Mar. 7, 2005

(65) Prior Publication Data
US 2005/0195902 A1  Sep. 8, 2005

(30) Foreign Application Priority Data
Mar. 8, 2004  (KR) .................... 10-2004-0015518

(51) Int. Cl.
*H04N 7/12* (2006.01)
(52) U.S. Cl. .................................. 375/240.25
(58) Field of Classification Search .............. 375/240.25
See application file for complete search history.

(56) References Cited
U.S. PATENT DOCUMENTS
5,903,310 A * 5/1999 Finotello et al. ....... 375/240.25

| | | | |
|---|---|---|---|
| 2004/0022107 A1* | 2/2004 | Zaidi et al. ................... | 365/202 |
| 2004/0207725 A1* | 10/2004 | Fandrianto et al. ....... | 348/14.13 |
| 2005/0012759 A1* | 1/2005 | Valmiki et al. .............. | 345/629 |

* cited by examiner

*Primary Examiner*—Y. Lee
*Assistant Examiner*—Richard Torrente
(74) *Attorney, Agent, or Firm*—Birch, Stewart, Kolasch & Birch, LLP

(57) ABSTRACT

A video decoding system is provided. When a DDR SDRAM is used as an external memory, MBs are rearranged and then stored to minimize memory access operations for the MBs at the DDR SDRAM and unnecessary additional word read operations caused by a DDR characteristic. Accordingly, the video decoding system can efficiently perform a memory access operation on MBs for video display and frame decoding by the video decoder. Specifically, the decoding system can reduce the total video decoding time, thereby allowing a surplus memory use time for additional functions of a digital broadcasting receiver.

22 Claims, 9 Drawing Sheets

VIDEO DECODING SYSTEM WITH EXTERNAL MEMORY REARRANGING ON A FIELD OR FRAMES BASIS

This application claims the benefit of the Korean Application No. 10-2004-0015518 filed on Mar. 8, 2004, which is hereby incorporated by reference.

BACKGROUND OF THE INVENTION

1. Field of the Invention

The present invention relates to a video decoding system, and more particularly, to a frame memory access controller of an MPEG-2 video decoding system used for a digital broadcasting receiver or a digital video conference system.

2. Discussion of the Related Art

The MPEG-2 technique has been adopted as a video compression standard for digital broadcasting currently prepared and serviced worldwide. Accordingly, a digital broadcasting receiver must be equipped with an MPEG-2 video decoding system.

In order to decode and display a high definition (HD) video or support various data broadcasts by the video decoding system, a processing speed of a video decoding chip must be increased. Accordingly, the video decoding system uses an external memory, such as a synchronous dynamic random access memory (SDRAM) or a double data rate (DDR) SDRAM.

For the HD video decoding, the external memory must include a memory area for a bit buffer and another memory area for storing decoded frames. Specifically, a memory space of about 10 through 13 Mbytes is used for storing the decoded frames.

However, when various memory access units (MAU) share the external memory, there is required a method for reducing the frequency and time of access of the external memory by the video decoding system.

SUMMARY OF THE INVENTION

Accordingly, the present invention is directed to a video decoding system that substantially obviates one or more problems due to limitations and disadvantages of the related art.

An object of the present invention is to provide a video decoding system capable of reducing a bandwidth of the external memory and a decoding time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended wings.

To achieve these objects and other advantages and in accordance with the purpose of the invention, as embodied and broadly described herein, a video decoding system includes: a video decoder for receiving a compressed bit stream via a $2^m$-bit internal memory bus, m being positive integer, and restoring the compressed bit stream to an original video signal by performing VLD (variable length decoding), IQ (inverse quantization), IDCT (inverted discrete cosine transform), and MC (motion compensation) on the compressed bit stream; an external memory for storing decoded video data in a memory map constructed in a field or frame structure or outputting data stored for MC via a $2^n$-bit external data bus, n being smaller than m, when storing the decoded video data or outputting the stored data; and a memory access controller for rearranging the decoded video data in the external memory so that data of an MB macro-block) are stored in or read out from the external memory on a field or frame basis.

The memory access controller may rearrange pixels by top fields and by bottom fields with respect to blocks of a luminance (Y) component and may store the rearranged pixels in the external memory in a field structure when decoded MBs are interlaced.

The memory access controller may rearrange pixels by top fields and by bottom fields with respect to 8×8 blocks of a chrominance (CbCr) component and may store the rearranged pixels in the external memory in a field structure when decoded MBs are interlaced.

The memory access controller may interface with the video decoder via a 128-bit internal memory bus, may interface with the external memory via a 64-bit external data bus, and may control rearrangement of decoded video data and data input/output.

The external memory may be a DDR SDRAM.

The memory access controller may include: a write FIFO block configured with an at least 2-step pipeline structure to store decoded video data; an MB write controller for rearranging pixels of Y and CbCr signals in one MB decoded at the video decoder by top fields and by bottom fields, storing the rearranged pixels in the write FIFO block, and then storing the rearranged pixels in the external memory in the form of an DDR SDRAM; a read FIFO block configured with an at least 3-step pipeline structure to store data read out from the DDR SDRAM-type external memory; and an MB read controller for generating read/write addresses of a read FIFO block and a DDR SDRAM read address so as to read out data of a column pair from the DDR SDRAM-type external memory and store the read-out data in the read FIFO block.

In another aspect of the present invention, a video decoding system includes: a video decoder for receiving a compressed bit stream and restoring the compressed bit stream to an original video signal by performing VLD (variable length decoding), IQ (inverse quantization), IDCT (inverted discrete cosine transform), and MC (motion compensation) on the compressed bit stream; an external memory configured with multi-banks each having a field-structured memory map, the external memory storing decoded luminance (Y) and chrominance (CbCr) signals in each field; and a memory access controller for rearranging pixels of Y and CbCr signals in one MB by top fields and by bottom fields and then storing the rearranged pixels in the external memory through a multi-bank write access operation, or reading out data stored in the external memory through a multi-bank read access operation.

The external memory may be a DDR SDRAM, and the memory access controller may interface with the video decoder via a 128-bit internal memory bus and may interface with the DDR SDRAM via a 64-bit external data bus.

The memory access controller may include: a write FIFO block configured with an at least 2-step pipeline structure to store decoded video data; an MB write controller for rearranging pixels of Y and CbCr signals in one MB decoded at the video decoder by top fields and by bottom fields, storing the rearranged pixels in the write FIFO block, and then generating read/write addresses of the write FIFO block and a DDR SDRAM address to store the rearranged pixels in the DDR SDRAM; a read FIFO block configured with an at least 3-step pipeline structure to store data read out from the DDR SDRAM; and an MB read controller for generating read/write addresses of a read FIFO block and a DDR SDRAM read address so as to read out data of a column pair from the DDR SDRAM and store the read-out data in the read FIFO block.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
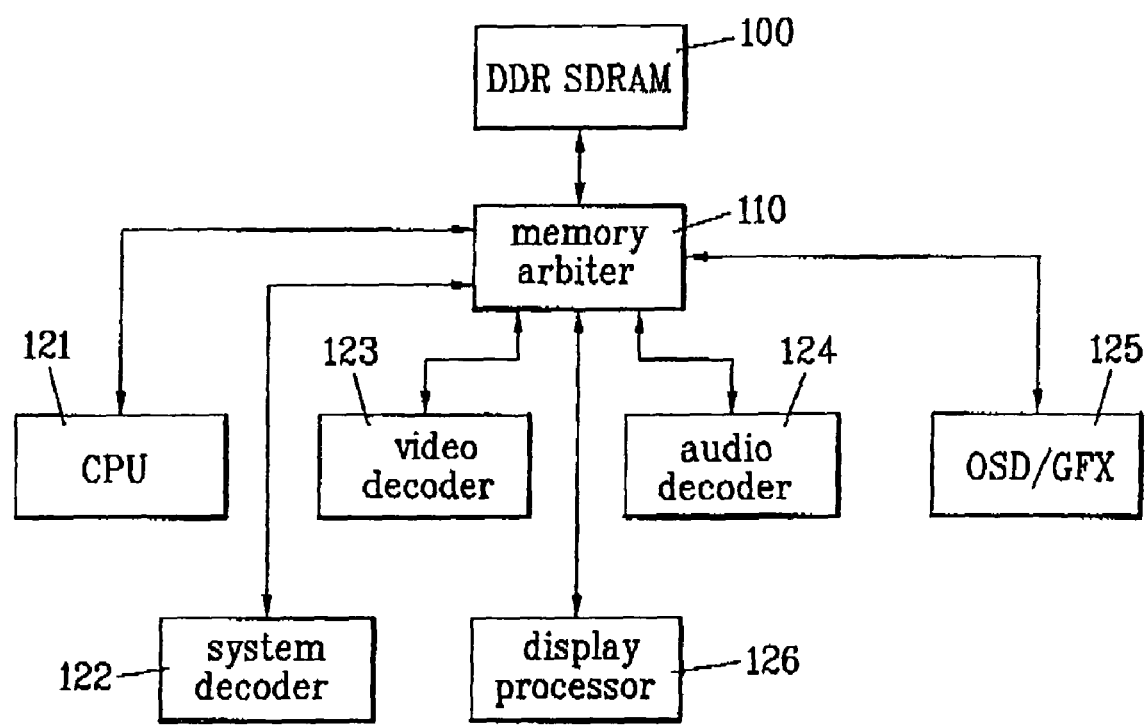
FIG. 1 is a block diagram of a digital broadcasting receiver according to an embodiment of the present invention.

FIG. 1 is a block diagram of a digital broadcasting receiver according to an embodiment of the present invention.

Referring to FIG. 1, a digital broadcasting receiver includes a CPU 121, a system decoder 122, a video decoder 123, an audio decoder 124, an on screen display/graphic engine (OSD/GFX) 125, a display processor 126, a memory arbiter 110, and an external memory (DDR SDRAM) 100.

The system decoder 122 selects a desired program from a plurality of programs included in one channel, and divides packetized audio and video bitstreams. The divided video bitstream is outputted through the memory arbiter 110 and the external memory 100 to the video decoder 123, and the divided audio bitstream is outputted through the memory arbiter 110 and the external memory 100 to the audio decoder 124.

The video decoder 123 removes an overhead (such as various header data and a start code) from the inputted video bitstream. Thereafter, the video decoder 123 restores the resulting pure video data to its original screen pixel value through a series of processes, variable length decoding (VLD), inverse quantization (IQ), inverted discrete cosine transform (IDCT), and motion compensation (MC) using a motion vector.

That is, when a transmitting MPEG-2 video encoder encodes a video of 25 through 60 frames into I/P/B pictures and transmits the encoded video to the digital broadcasting MPEG-2 video decoder 123 receives and decodes the encoded video on a slice basis. Here, the slice is a series of macro-blocks (MBs).

At this time, an intra MB is restored to an original video signal through VLD, IQ and IDCT in the video decoder 123. An inter MB is restored to an original video signal through motion compensation of a current MB in relation to an MB read out from a reference frame of the external memory 100, and then a corresponding MB is rewritten in the external memory 100. Thereafter, when one frame is decoded and then stored in the external memory 100, the decoded frame is timely read out by the display processor 126 and then displayed on a screen of the digital broadcasting receiver.

The video decoder 123 accesses the external memory 100 through the memory arbiter 110 so as to read/write a bitstream for video decoding, to read data necessary for motion compensation, and to write decoded data.

The audio decoder 124 restores an inputted compressed audio bitstream to an original audio signal through an MPEG decoding algorithm or an audio coding (AC)-3 decoding algorithm.

Like the video decoder 123, the audio decoder 124 also accesses the external memory 100 through the memory arbiter 110 so as to read/write a bitstream for audio decoding and to write decoded data.

The CPU 121 also accesses the external memory 100 through the memory arbiter 110 so as to control an overall operation of the digital broadcasting receiver, such as the audio/video data division operation, the audio/video decoding operation, and a display operation.

A current trend is that the digital broadcasting receiver is developed into a system on chip (SOC) type. That is, memory access units (MAUs) such as the CPU 121, the system decoder 122, the video decoder 123, the audio decoder 124, the OSD/GFX 125, and the display processor 126 are integrally embodied in one chip.

In the case of the SOC-type digital broadcasting receiver, the CPU 121 and the A/V related blocks 122 through 126 may share the total area of the external memory 100 in the form of a unified memory, or may exclusively use their own areas of a partitioned external memory.

In the case of the shared external memory 100 in the form of a unified memory, its total memory area is properly allocated to one of the MAUs 121 through 126 according to circumstances, and its interface lines (that is, its outer connection pines) can be reduced in number.

FIG. 1 illustrates a case where the MAUs 121 through 126 in an SOC chip are connected in parallel to the shared external memory 100 through the memory arbiter 110.

When some or all of the MAUs 121 through 126 participate in a memory data bus arbitration so as to access the shared external memory 100, the memory arbiter 110 permits one of the some or all MAUs to use the memory data bus. That is, when desiring to write data in the memory 100 or to read out data from the memory 100, some of the MAUs 121 through 126 first send requests for permission to access the memory 100 to the memory arbiter 110. Upon receipt of the requests from the MAUs, the memory arbiter 110 checks the received requests to thereby determine which request should be first permitted, and then permits the first-permitted MAU to use the memory data bus so that the first-permitted MAU can access the memory 100 (ack).

At this time, a system having many MAUs connected to a shared memory can be stably operated only when each MAU can read/write the shared memory without being hindered in its operation.

In the case of a system equipped with many MAUs sharing one memory, it is necessary to efficiently control the memory so that each MAU can access the memory suitably for its operation speed. Also, it is necessary to secure a sufficient memory bandwidth.

The memory bandwidth may be secured by increasing the operating frequency of the memory. However, the increased operating frequency makes it difficult to construct the system due to a danger of noise, and also increases a cost because separate hardware blocks must be added to secure correct timing. Accordingly, there is required a novel method for securing the maximum memory bandwidth at a suitable memory operation frequency.

When a DDR SDRAM is used as the external memory 100, the MAUs 121 through 126 exchange data with the memory arbiter 110 via an 128-bit internal bus, and the memory arbiter 110 exchanges data with the DDR SDRAM via a 32 or 64-bit external data bus. If the memory arbiter 110 exchanges data with the DDR SDRAM via a 64-bit external data bus, the DDR SDRAM can read or write data twice per clock cycle.

Also, if a DDR SDRAM or an SDRAM is used as the external memory 100, initialization processes for several clocks are necessary to start a memory access operation at a specific address. When many data are read at one access operation, the data can be successively read. Here, since many MAUs share the memory, it is necessary for each MAU to complete its memory access operation within a given time. This is because the internal buffer size of the MAU must be restricted.

Specifically, in the case of the digital broadcasting receiver, the video decoder 123 accesses the external memory 100 more than the other MAUs. The memory access amount of the video decoder 123 occupies up to 70% of the total bandwidth of the external memory 100. Accordingly, there is required a method for reducing the memory access amount of the video decoder 123.

Figure 2:
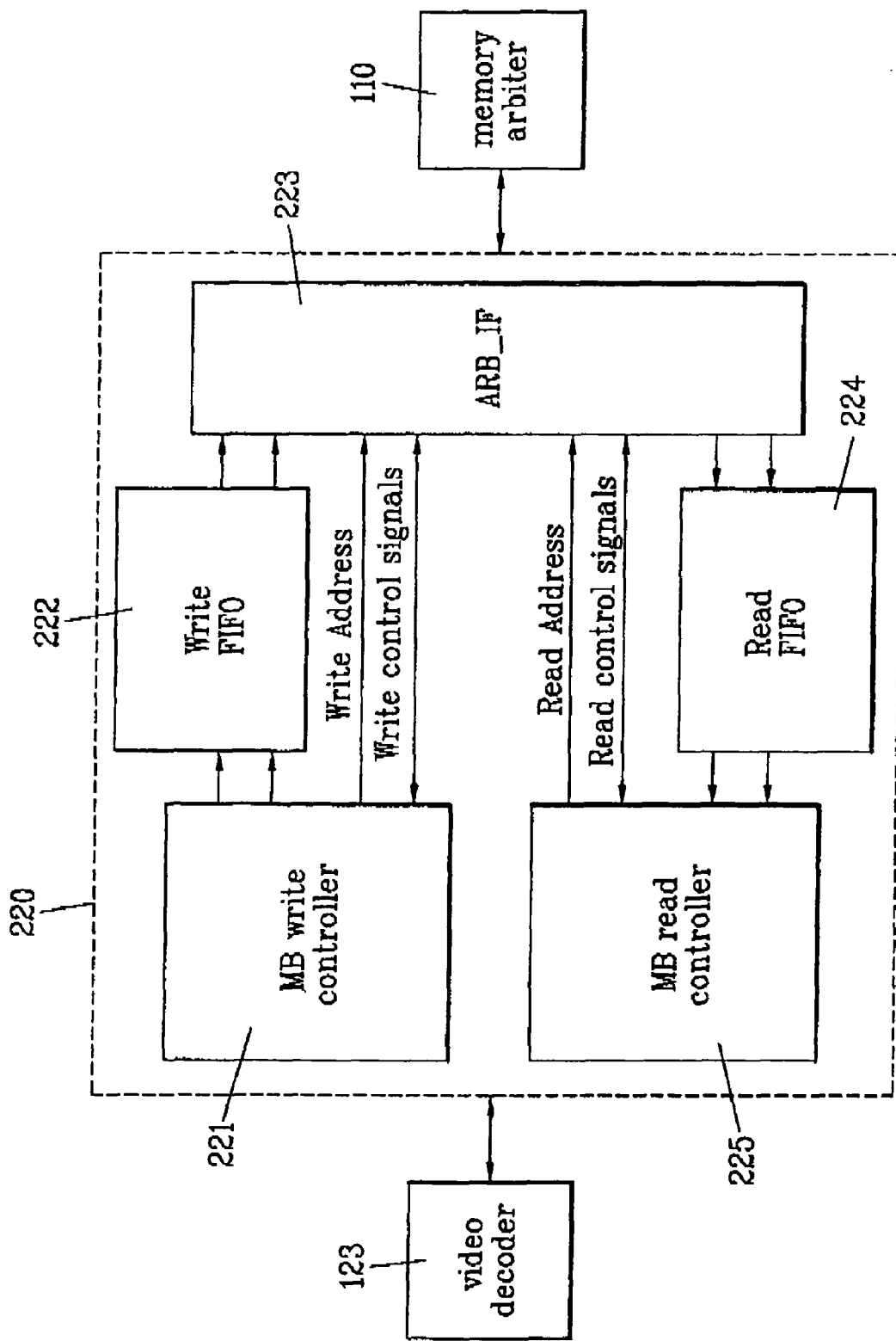
FIG. 2 is a block diagram of a memory access controller for a video decoding system according to an embodiment of the present invention.

FIG. 2 is a block diagram of a memory access controller for a video decoding system according to an embodiment of the present invention.

Referring to FIG. 2, an inventive memory access controller 220 is provided and connected between the memory arbiter 110 and the video decoder 123 to thereby reduce the bandwidth of the external memory (DDR SDRAM) 100 and a required decoding time.

The memory access controller 220 includes an MB write controller 221, a write FIFO (first input first output) block 222, a memory arbiter interface (ARB_IF) 223, a read FIFO block 224, and an MB read controller 225. For convenience of explanation, the MB write controller 221 and the write FIFO block 222 are together called "an MB write block", and the MB read controller 225 and the read FIFO block 224 are together called "an MB read block".

The video decoder 123 restores an original video signal by performing V LD, IQ, IDCT and MC in relation to a compressed bit stream.

At this time, a picture according to the MPEG is classified into three pictures, that is, I/P/B pictures. If the IDCTed data is an I picture, it is a complete picture that can be displayed as it is. Otherwise, if the IDCTed data is a B or P picture, it is an incomplete picture requiring MC.

Accordingly, if the IDCTed data is an I picture, the IQ/ICDT result is stored in the external memory 100 through the MB write block.

However, if the IDCTed data is a B or P picture, an original picture is completely restored by performing the MC of the incomplete picture in relation to a previous picture read out from the external memory 100. That is, the B or P picture is motion-compensated in relation to a current pixel value by using a previous picture stored in the external memory 100 and a VLDed motion vector, and then the resulting value and an IDCTed value are added, whereby a complete video is restored. The so-restored complete video is stored in the external memory 10 through the MB write block.

The MB write controller 221 of the MB write block outputs a write address and an enable signal so as to rearrange the decoded video data and store the rearranged data in the external memory 100, and transmits/receives control signals between the video decoder 123 and the memory arbiter interface 223.

That is, the MB write controller 221 controls the arrangement of the MCs so as to minimize memory access times for MCs and an unnecessary additional word read operation caused by a DDR characteristic in the external memory 100.

Also, the MB write controller 221 includes a video compressor, and the video compressor compresses MBs to then store the compressed MBs in the external memory 100 through the write FIFO block 222. On the contrary, the MB read controller 225 includes a video decompressor, and the video decompressor decompresses MBs read out from the external memory 100 if the read MBs have been compressed.

In this manner, the MB write controller 221 checks whether or not corresponding MBs have been compressed, a compression method, data on a video format, data on a currently-decoded frame, and so on to thereby calculate a start address and a data amount necessary for memory write request, and then rearrange data outputted from the video decoder 123 to then store the rearranged data in the write FIFO block 222.

In the meantime, the MB read controller 225 generates a read address from reference MB position data necessary for memory read request and MC, and then outputs the generated read address to the memory arbiter interface 223. Also, the MB read controller 225 suitably rearranges data that is read out from a corresponding memory read address of the external memory 100 via the memory arbiter interface 223, and then stores the rearranged data in the read FIFO block 224.

If data read out from the external memory 100 has been compressed, the MB read controller 225 restores the compressed data through the video decompressor. If the read-out data corresponds to a half-pel mode, the MB read controller 225 constructs MBs for MC through a block for calculating a suitable value, and then generates a suitable signal readable by a motion compensator in the video decoder 123.

That is, the memory write access for the external memory 100 is generated when the video decoder 123 stores decoded video data in the external memory 100, and the memory read access for the external memory 100 is generated when the video decoder 123 performs MC or displays the decoded video data on a display.

Figure 3:
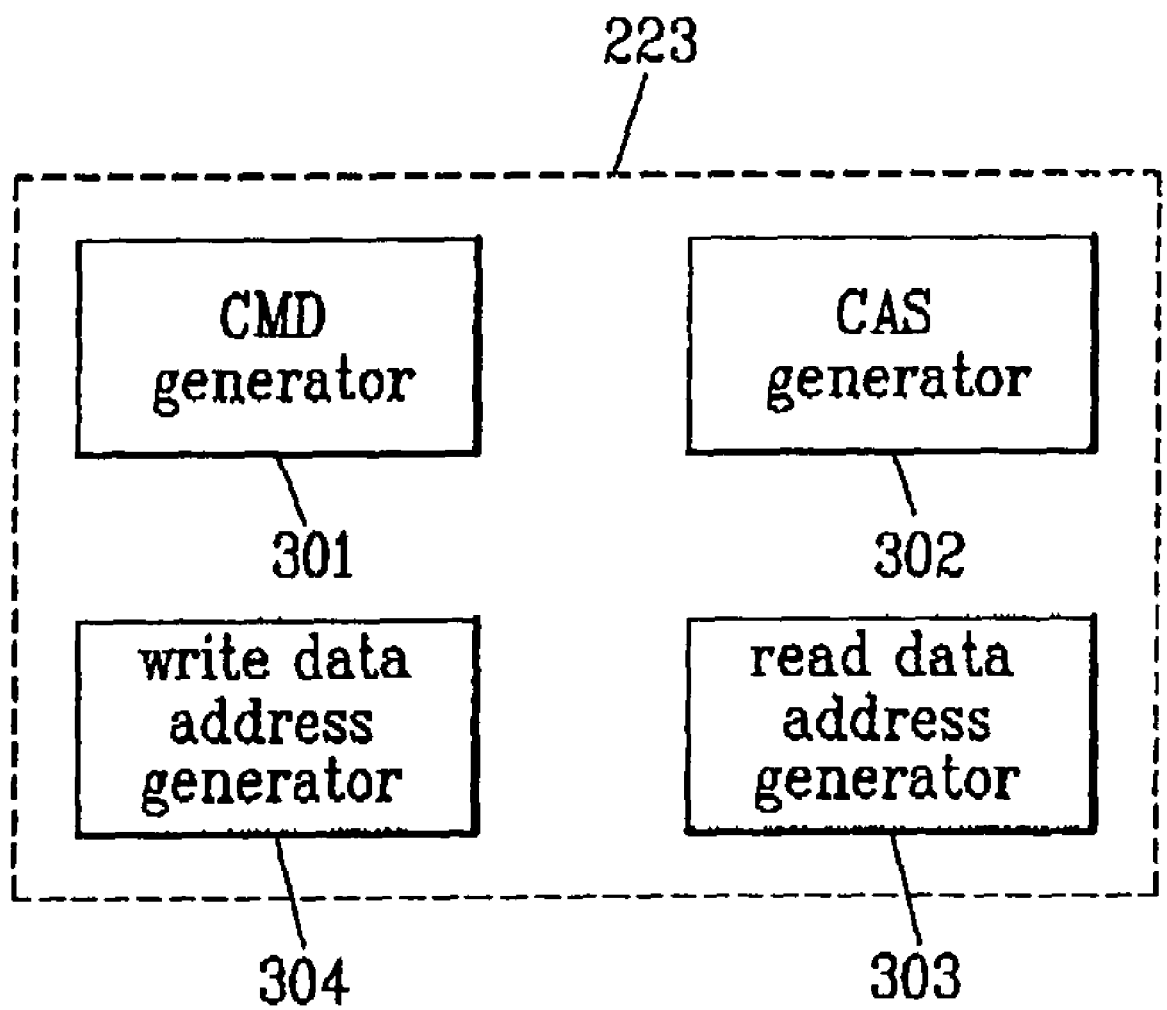
FIG. 3 is a detailed block diagram of a memory arbiter interface shown in FIG. 2.

FIG. 3 is a detailed block diagram of a memory arbiter interface shown in FIG. 2.

Referring to FIG. 3, the memory arbiter interface 223 includes a command (CMD) generator 301, a column address strobe (CAS) generator 302, a write data address generator 303, and a read data address generator 304.

The CMD generator 301 generates commands including a row address and a start column address of the external DDR SDRAM 100, a read or write data amount at the external DDR SDRAM 100, a discrimination signal for read or write request, and a signal indicating whether or not multi-bank access is generated. Also, the CMD generator 301 generates a command for memory access request, and sends the memory access request command to the memory arbiter 110. Also, in case of the multi-bank, the CMD generator 301 prepares an address of corresponding bank according to a memory data bus use permission signal (ack) to then generate a command.

The CAS generator 302 generates a suitable column address to be transmitted through the memory arbiter 110 to the external DDR SDRAM 100, according to modes.

The read data address generator 303 calculates and generates an address of the read FIFO block 224 so that data read out from the external DDR SDRAM 110 are rearranged in the read FIFO block 224 in a suitable order.

The write data address generator 304 generates a memory write address for writing data stored in the write FIFO block 222 in the external DDR SDRAM 100, and then outputs the generated memory write address to the memory arbiter 110.

In an embodiment of the present invention, it is assumed that a DDR SDRAM is used as the external memory 100 and a data read/write operation is performed via a 64-bit external data bus.

That is, a 64-bit external data bus is connected between the external DDR SDRAM 100 and the memory access controller 220, and a 128-bit internal memory bus is connected between the memory access controller 220 and the video decoder 123.

The memory access controller 220 rearranges MBs and stores the rearranged MBS in the external DDR SDRAM 100 so as to minimize memory access times for MCs and an unnecessary additional word read operation caused by a DDR characteristic in the external DDR SDRAM 100. A memory map of the external DDR SDRAM 100 is varied suitably according to video modes, compression or non-compression, and compression methods.

Three memory access operations that must be considered are an MB write operation after video decoding, an MB read operation for MC, and an MB read operation for video display.

Figure 4:
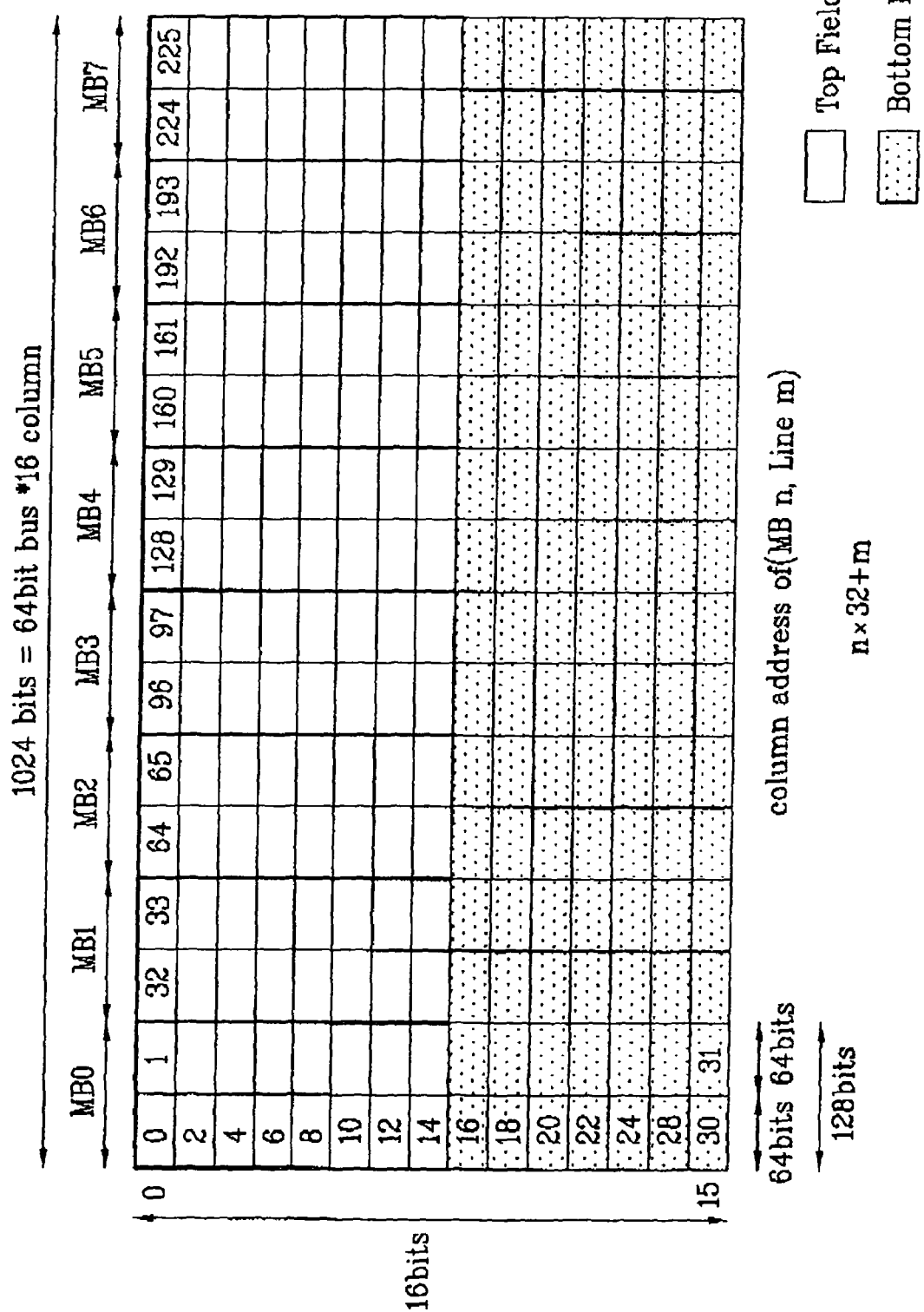
FIG. 4 illustrates a column arrangement in a row 1 of an external memory with regard to a "Y" signal in one MB when a 64-bit external memory bus is used.

FIG. 4 illustrates an example of a luminance MB arrangement for an interlaced scanned video in a non-compression mode, which shows a memory map of a field structure. In one MB, a luminance (Y) signal includes 8 bit×16×16 data, and a chrominance (CbCr) signal includes 8 bit×8×8 data. The luminance signal includes 4 Y blocks (8×8), and the chrominance signal includes 2 C blocks (CbCr, 8×8).

At this time, the MB write controller 221 rearranges pixels with respect to Y blocks by top fields and by bottom fields, stores the rearranged pixels in the write FIFO block 222, and then writes the same in the external DDR SDRAM 100, whereby a memory map of a field unit shown in FIG. 4 can be constructed. Here, 64 bits constitute one Y block in a horizontal direction, and thus 128 bits are read when two Y blocks are simultaneously accessed.

Consequently, when the external memory is accessed for field predictive MC with respect to one MB, a column address is sequentially increased per field, whereby efficiency is increased because memory read latency is reduced.

In FIG. 4, a Y signal indicates a column address of the external memory 100 with respect to MBS for a row 1. The Y signal includes 8 MBs in a row 1.

At this time, since the external DDR SDRAM 100 has an external data size of 64 bits and uses both a rising edge clock and a falling edge clock, an actual memory map is constructed on a 128-bit basis as shown in FIG. 4. The column address is increased on an even number basis. That is, the column address is increased in the order of 0, 2, 4, 6, . . . . Accordingly, the memory arbiter interface 223 fetches data of a column address corresponding to an even number at a rising edge clock, and fetches data of a column address corresponding to an odd number at a falling edge clock. Therefore, when compared with an SDRAM, the DDR SDRM 100 has double memory efficiency at the same memory clock.

That is, in FIG. 4, one Y block (or a luminance value of 8 pixels) becomes 64-bit data, and a value for vertical neighboring 8 pixels of an MB is positioned in a column of a neighboring address. Although 4 vertical blocks are actually read out and then one of them is discarded when 3 vertical blocks must be read out for half-pel prediction at MC, data can be sequentially read out during the read operation for video display without an additional data read operation. When considering an MC amount and a display data read amount calculated, the MB arrangement shown in FIG. 4 becomes an optimal arrangement.

Figure 5:
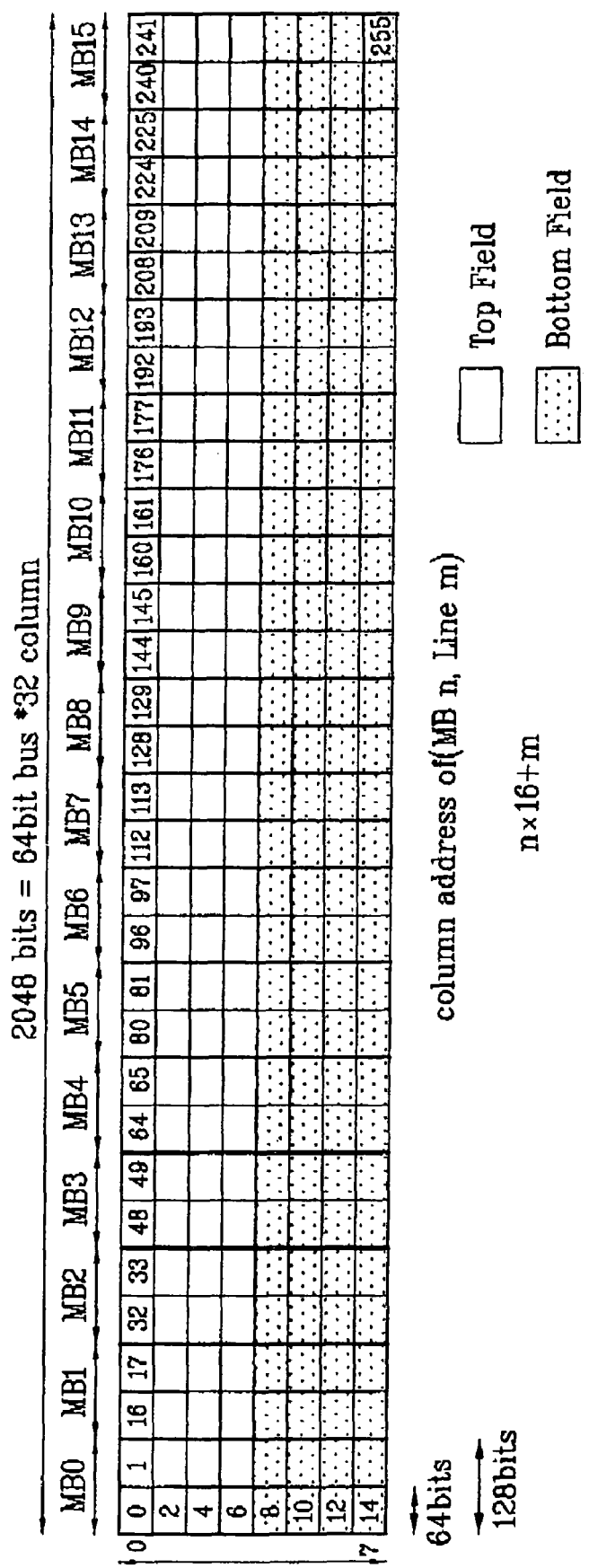
FIG. 5 illustrates a column arrangement in a row 1 of an external memory with regard to a "C" signal in one MB when a 64-bit external memory bus is used.

FIG. 5 illustrates an example of a chrominance MB arrangement for an interlaced scanned video in a non-compression mode, which shows a memory map of a field structure. Since a Cb component and a Cr component are read out at the same horizontal direction position, the CbCr MBs are arranged to be easily accessed at once.

The chrominance signal (CbCr) includes 16 MBs in a row 1 as shown in FIG. 5.

That is, in the case of CbCr also, the MB write controller 221 rearranges pixels by top fields and by bottom fields, whereby a memory map is constructed on a field basis as shown in FIG. 5. At this time, one C block is rearranged by a Cb pixel of a top field, a Cr pixel of the top field, a Cb pixel of a bottom field, and a Cr pixel of the bottom field that respectively has a size of 4×4. Another C block is rearranged by CbCr pixels in the same structure as the one C block. This results in that one C block corresponds to two Y blocks obtained by rearranging pixels by top fields and by bottom fields.

Since CbCr signals are rearranged as shown in FIG. 5, a processing efficiency can be enhanced by reading/writing a color signal on a 64-bit basis to match with a 64-bit Y signal when accessing the memory on a 64-bit basis. Also, up to 16 words (one word=128 bits) are read/written at one memory access operation, whereby one MB can be written in the external memory 100 at one memory access operation.

Figure 6A:
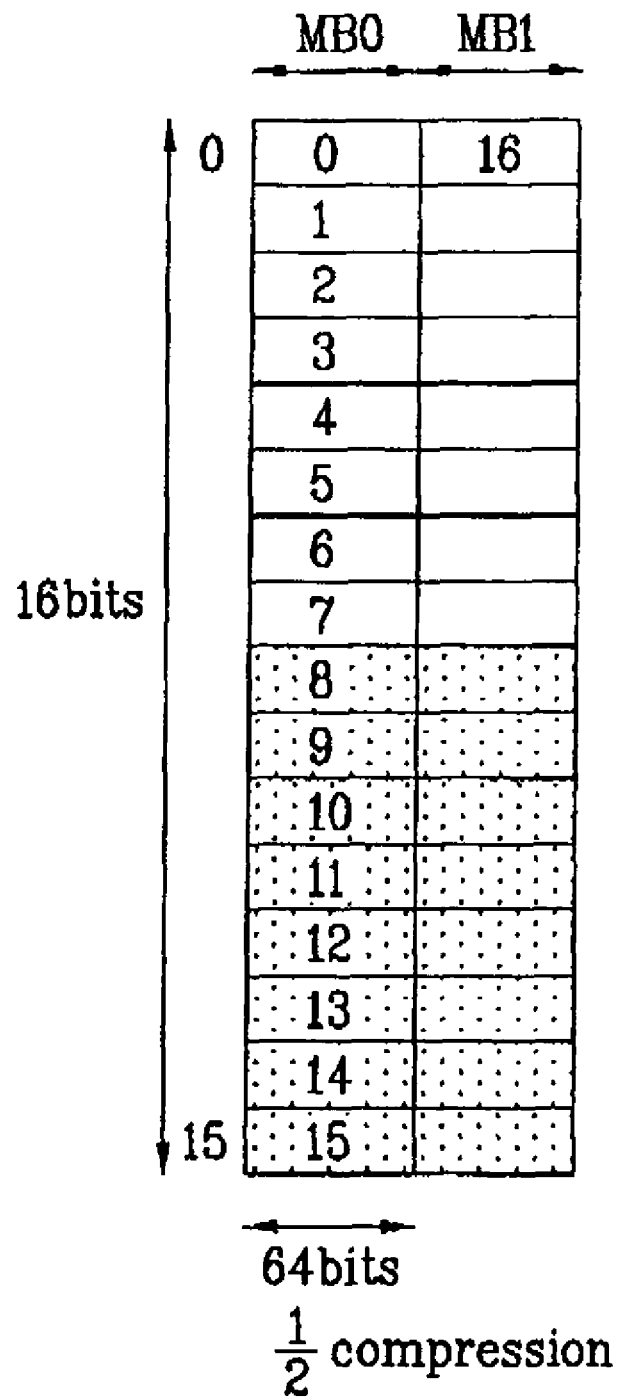
FIGS. 6A and 6B illustrate examples of MB arrangement per column in an external memory in a compression mode.
Figure 6B:
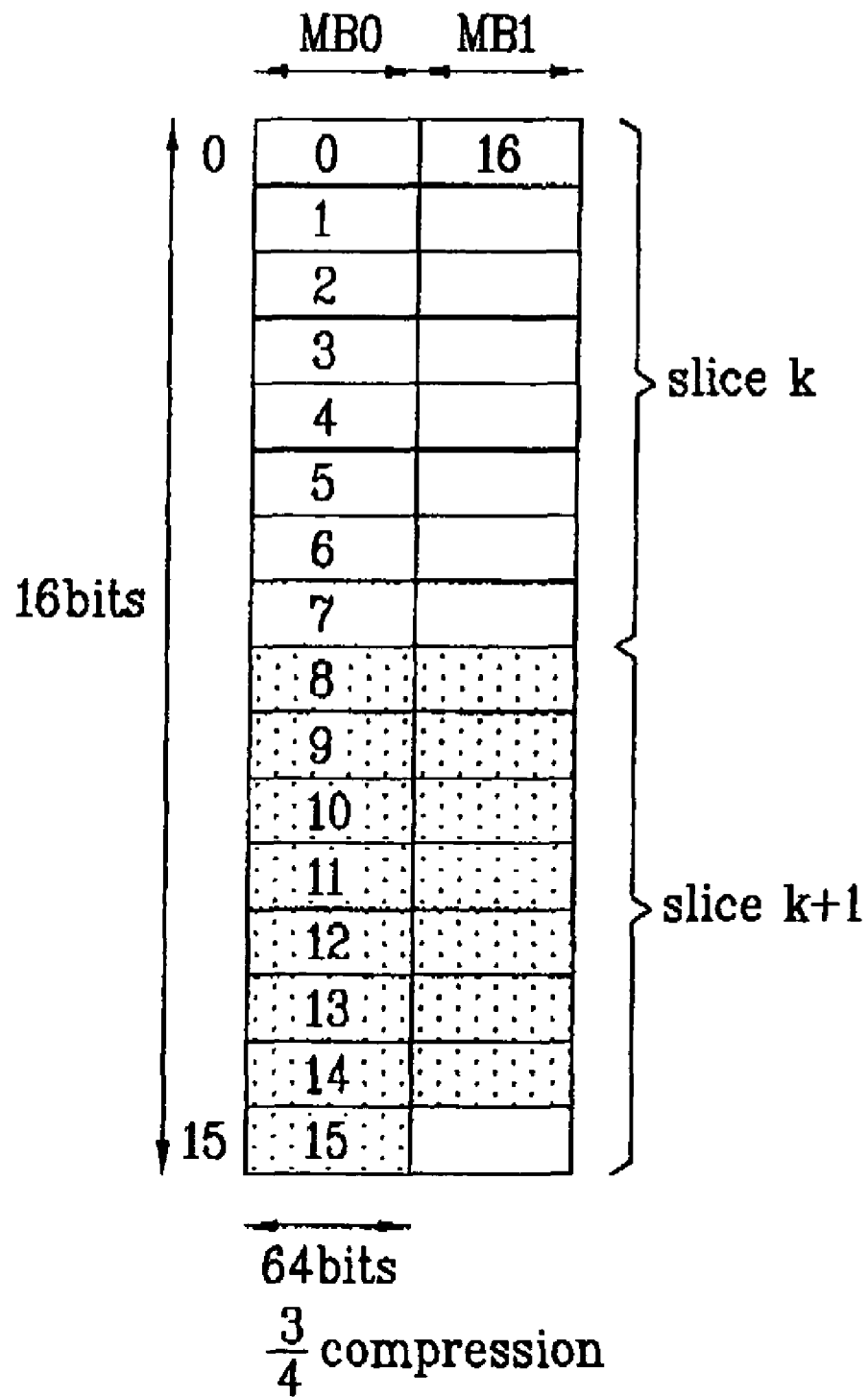

FIGS. 6A and 6B illustrate a relationship between an MB pixel position and a column address in the DDR SDRAM 100 when the video compressor of the MB write controller 221 compresses decoded video data by $$\frac{1}{2} \text{ or } \frac{3}{4}.$$

In FIGS. 6A and 6B, an 8-pixel-valued vertical neighboring pixel is arranged in the next column address. In this case, the number of discarded pixel values can be increased due to a horizontal $$\frac{1}{2}$$

compression effect when arranging neighboring addresses horizontally. Accordingly, an unnecessary read operation can be minimized when data is read for MC. Instead of the above structure, data for display is read one by one and is discarded one by one. At this time, the total read access amount becomes most efficient because the total data read access amount is reduced due to the compression effect.

In the case of the $$\frac{3}{4}$$

compression, compression is performed horizontally and vertically, whereby a data amount can be reduce by $$\frac{1}{4}.$$

For this purpose, an accessed amount for once is arranged in such a way that data corresponding two slices is arranged in one bank, as shown in FIG. 6B.

FIG. 7 illustrates a structure of the read FIFO block 224 for transmitting data, which is read out from the external memory 100 by the memory arbiter interface 223 through a read access operation, to the MB read controller 225, and an address control method therefor.

Figure 7A:
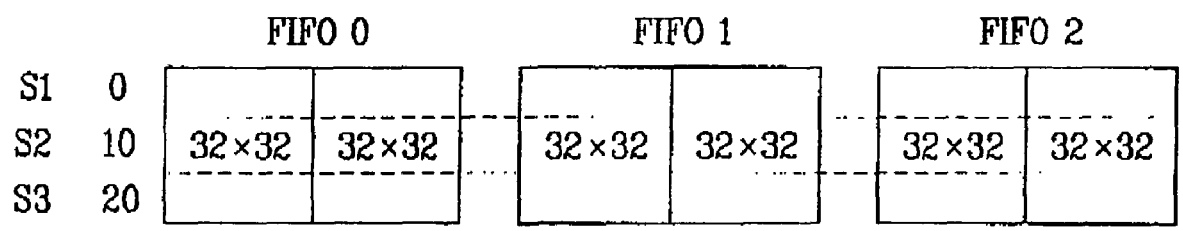
FIG. 7A illustrates a detailed structure of a read FIFO block shown in FIG. 2.

As shown in FIG. 7A, the read FIFO block 224 includes 6 32×32 FIFOs so that it can suitably rearrange and transmit compressed data by a bust width of 64 bits by which data can be transmitted to the video decompressor of the MB read controller 225. The respective FIFOs are used as 3-step buffers respectively corresponding to addresses 0 to 9, addresses 10 to 19, and addresses 20 to 29, whereby a pipeline access structure can be supported during the read access operation. At this time, the number of steps of a read FIFO may be increased according to a required read operation performance.

Figure 7B:
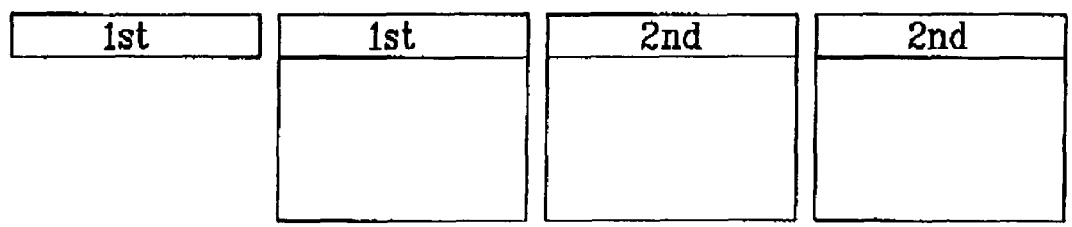
FIG. 7B illustrates an example of controlling the read FIFO block of FIG. 7A in a non-compression mode.
Figure 7C:
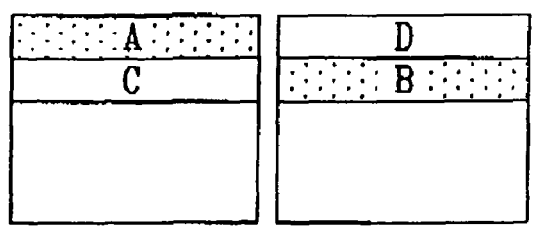
FIG. 7C illustrates an example of controlling the read FIFO block of FIG. 7A in a compression mode.

FIG. 7B illustrates an example of controlling the read FIFO block of FIG. 7A in a non-compression mode. In the case of a non-compression mode, a horizontal pair of data is read out from an area on the memory map shown in FIG. 4, and the read-out data is filled in the read FIFO block 234. Referring to FIG. 7B, when vertical 3-line data are read in, a read access operation is performed in pair-wise fashion with respect to 2 lines, and 64-bit data for 1 line are discarded. FIG. 7C illustrates an example of controlling the read FIFO block of FIG. 7A in a compression mode. In the case of a non-compression mode, as shown in FIF. 7C, "A" and "B" data, which is simultaneous read in according to a read address and an enable signal of each FIFO, are written in the same line. After the "A" and "B" data are completely written, "D" and "C" data of different lines are written. When data are sent to the video decompressor of the MB read controller 225, the "A" and "D" data are first read out simultaneously, and then "B" and "C" data are read out simultaneously.

That is, the inventive FIFO has a pipeline structure of 2 or more steps so that read/write operations between the memory arbiter interface 223 and the write FIFO block 222 and the read FIFO block 224 can be independently performed. This minimizes a decoding delay due to a memory access operation. In an embodiment of the present invention, the write FIFO block 222 has a 2-step buffer, and the read FIFO block 224 has a 3-step buffer. In this structure, the number of the above steps can be increased according to the number of the MAUs.

Figure 8:
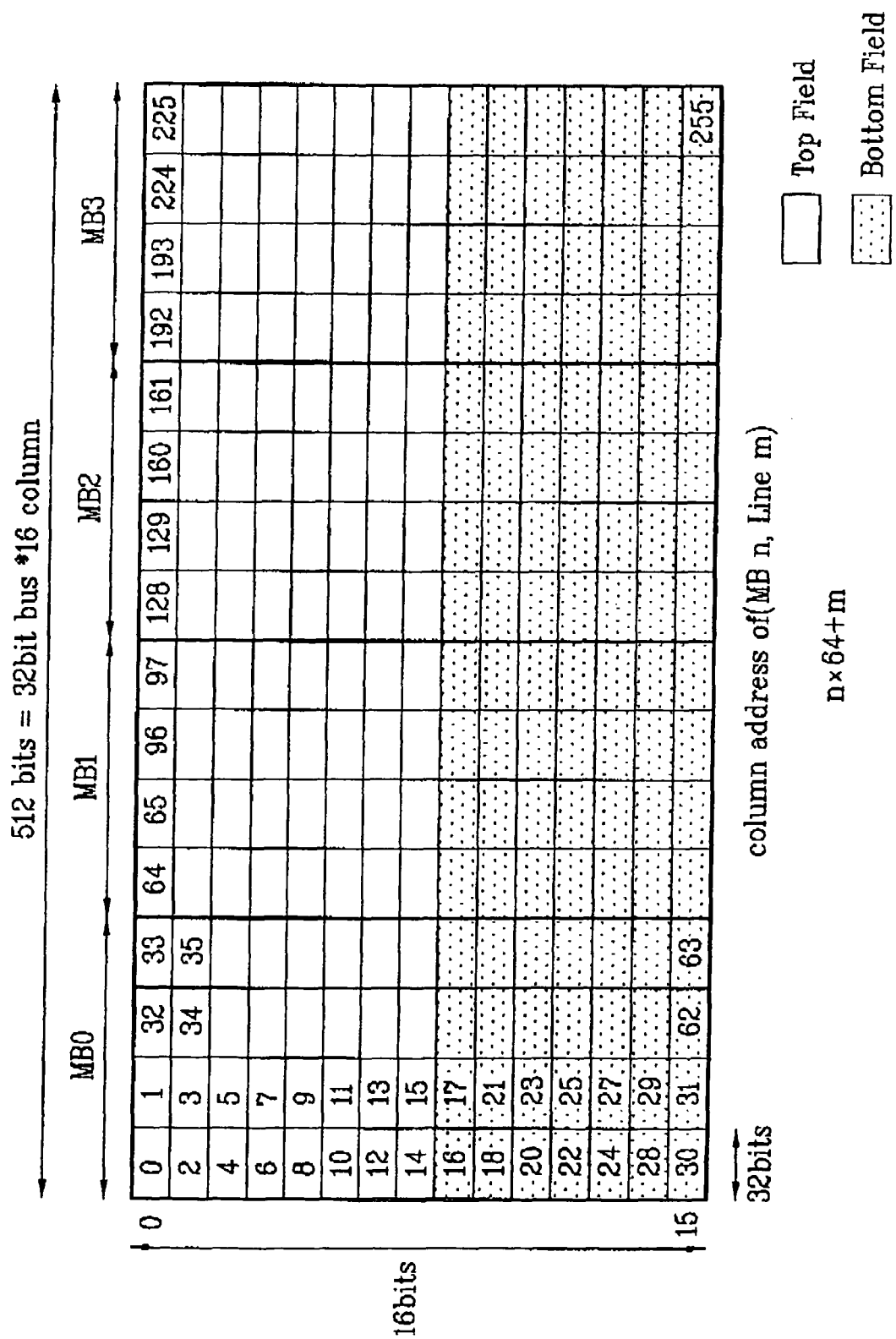
FIG. 8 illustrates a column arrangement in a row 1 of an external memory with regard to a "Y" signal in one MB when a 32-bit external memory bus is used.

FIG. 8 illustrates a modification of the above memory map when the external memory 100 reads/writes data via a 32-bit external data bus. When one memory having a 32-bit data pin or two 16-bit memories is/are used in consideration of a memory price, a suitable modification is required to construct the 32-bit external data bus. In this case, vertically-arranged two successive columns are regarded as previous 64-bit value, and it is regarded that one data is exchanged per clock.

At this time, data transmission between the MB write controller 221 and the memory arbiter interface 223 is performed via the write FIFO block 222. Here, the write FIFO block 222 has a buffer size capable of storing a non-compressed MB. Accordingly, in the case of $$\frac{1}{2}$$

compression, the write FIFO block 222 can store two compressed MBs.

When the MB write controller 221 compresses MBs to be stored in the external memory 100, the present invention controls a memory write access operation on a two-MB basis. That is, when even-numbered MBs are accessed, "Y" and "C" blocks are requested to be written.

Also, the present invention reduces the number of memory access operations during the MPEG video decoding through the above-structured memory map, and uses an multi-operation bank access operation so as to reduce a delay and a bandwidth waste due to clocks necessary for read, write and initialization operations. That is, in the case of a write access operation for a field picture, a 2-bank access operation is used to divisively write data in two slices on a memory map. Also, in the case of a read access operation, a 1, 2 or 4-bank access operation is used to read data of several MBs for MC. This structure can be suitably supported according to the inventive memory map structure, a frame structure or a video format, and data bus size.

As stated above, the inventive video decoding system can efficiently perform a memory access operation on MBs for video display and frame decoding by the video decoder when many MAUs share the external memory. Specifically, the inventive decoding system can reduce the total video decoding time, thereby allowing a surplus memory use time for additional functions of the digital broadcasting receiver. Also, the present invention can provide a high-memory performance memory access operation so that one video decoder can perform two HD-grade video decoding operations.

It will be apparent to those skilled in the art that various modifications and variations can be made in the present invention. Thus, it is intended that the present invention covers the modifications and variations of this invention provided they come within the scope of the appended claims and their equivalents.

What is claimed is:
1. A video decoding system, comprising:
a video decoder configured to receive a compressed bit stream via an internal memory bus and restore the compressed bit stream to an interlaced scanned video signal by performing VLD (variable length decoding), IQ (inverse quantization), IDCT (inverted discrete cosine transform), and MC (motion compensation) on the compressed bit stream;
an external memory configured to store decoded video data in a memory map constructed in a field or frame struc- ture or output data stored for MC via an external data bus when storing the decoded video data or outputting the stored data;

a memory access controller configured to rearrange data of an MB (macro-block) of the interlaced scanned video signal in the external memory so that the data of the MB are stored in or read out from the external memory on a field or frame basis; and a memory arbiter configured to receive a request for permission to access the memory from the memory access controller and determine whether to permit the memory access controller to use the external data bus, wherein, the video decoder, the memory access controller and the memory arbiter are formed in a single chip, and the memory access controller is connected between the memory arbiter and the video decoder, and wherein the memory access controller comprises:

a write FIFO block configured with an at least 2-step pipeline structure to store the decoded video data;

an MB write controller configured to rearrange pixels of Y and CbCr signals in one MB decoded at the video decoder by top fields and by bottom fields, store the rearranged pixels in the write FIFO block, and then store the rearranged pixels in the external memory in the form of a DDR SDRAM;

a read FIFO block configured with an at least 3-step pipeline structure to store data read out from the DDR SDRAM-type external memory; and an MB read controller configured to generate read/write addresses of a read FIFO block and a DDR SDRAM read address so as to read out data of a column pair from the DDR SDRAM-type external memory and store the read-out data in the read FIFO block.

2. The system of claim 1, wherein the memory access controller rearranges pixels by top fields and by bottom fields with respect to blocks of a luminance (Y) component and stores the rearranged pixels in the external memory in the field structure when decoded MBs are interlaced.

3. The system of claim 1, wherein the memory access controller rearranges pixels by top fields and by bottom fields with respect to 8×8 blocks of a chrominance (CbCr) component and stores the rearranged pixels in the external memory in the field structure when decoded MBs are interlaced.

4. The system of claim 3, wherein the memory access controller reconstructs respective 8×8 blocks with pixels of a Cb top field, a Cr top field, a Cb bottom field and a Cr bottom field of respective 4×4 pixels rearranged in the field structure, and accesses a 64-bit chrominance signal corresponding to a 64-bit Y signal when performing a memory access operation on a 64-bit basis.

5. The system of claim 1, wherein the internal memory bus is a $2^m$-bit internal memory bus, m is a positive integer, the external data but is a $2^n$-bit external data bus and n is smaller than m.

6. The system of claim 5, wherein m is 7 and n is 6.

7. The system of claim 1, wherein the memory access controller interfaces with the video decoder via a 128-bit internal memory bus and controls rearrangement of the decoded video data and data input/output.

8. The system of claim 1, wherein the external memory is a DDR SDRAM (double data rate random access memory).

9. The system of claim 1, wherein the external memory is shared by a plurality of memory access units (MAUs) including the video decoder.

10. The system of claim 1, wherein the memory access controller constructs one word with 128 bits with respect to decoded MBs, and performs a control operation so that 16 words are stored in or read out from the external memory at one external memory access operation.

11. The system of claim 1, wherein the MB write controller includes a video compressor configured to compress decoded MB data outputted from the video decoder, and rearranges the pixels of Y and CbCr signals in a compressed MB by the top fields and by the bottom fields to then store the rearranged pixels in the write FIFO block.

12. The system of claim 1, wherein the MB write controller controls a DDR SDRAM write access operation on a 2-MB basis when MBs to be stored in the DDR SDRAM-type external memory is compressed.

13. The system of claim 1, wherein the MB read controller includes a video decompressor configured to decompress compressed MB data read out from the DDR SDRAM-type external memory.

14. The system of claim 1, wherein the memory arbiter interfaces with the external memory via a 64-bit external data bus.

15. A video decoding system, comprising:

a video decoder configured to receive a compressed hit stream and restore the compressed bit stream to an interlaced scanned video signal by performing VLD (variable length decoding), IQ (inverse quantization), IDCT (inverted discrete cosine transform), and MC (motion compensation) on the compressed bit stream;

an external memory configured with multi-banks each having a field-structured memory map, the external memory storing decoded luminance (Y) and chrominance (CbCr) signals in each field;

a memory access controller configured to rearrange pixels of Y and CbCr signals in one MB of the interlaced scanned video signal by top fields and by bottom fields and then store the rearranged pixels in the external memory through a multi-bank write access operation, or read out data stored in the external memory through a multi-hank read access operation; and a memory arbiter configured to receive a request for permission to access the memory from the memory access controller and determine whether to permit the memory access controller to use the external memory, wherein, the video decoder, the memory access controller and the memory arbiter are formed in a single chip, and the memory access controller is connected between the memory arbiter and the video decoder, and wherein the memory access controller comprises:

a write FIFO block configured with an at least 2-step pipeline structure to store decoded video data;

an MB write controller configured to rearrange pixels of Y and CbCr signals in one MB decoded at the video decoder by top fields and by bottom fields, store the rearranged pixels in the write FIFO block, and then generate read/write addresses of the write FIFO block and a DDR SDRAM address to store the rearranged pixels in the DDR SDRAM;

a read FIFO block configured with an at least 3-step pipeline structure to store data read out from the DDR SDRAM; and an MB read controller configured to generate read/write addresses of a read FIFO block and a DDR SDRAM read address so as to read out data of a column pair from the DDR SDRAM and store the read-out data in the read FIFO block.

16. The system of claim 15, wherein the external memory is a DDR SDRAM (double data rate random access memory) and the memory access controller interfaces with the video decoder via a 128-bit internal memory bus.

17. The system of claim 16, wherein the memory arbiter interfaces with the DDR SDRAM via a 64-bit external data bus.

18. The system of claim 15, wherein the memory access controller constructs one word with 128 bits with respect to decoded MBs, and performs a control operation so that 16 words are stored in or read out from the external memory at one external memory access operation.

19. The system of claim 15, wherein the memory access controller reconstructs a memory map of the external memory according to whether or not inputted data is compressed, a compression method and a video mode of the inputted data.

20. The system of claim 15, wherein the MB write controller includes a video compressor configured to compress decoded MB data outputted from the video decoder, and rearranges the pixels of Y and CbCr signals in a compressed MB by the top fields and by the bottom fields to then store the rearranged pixels in the write FIFO block.

21. The system of claim 15, wherein the MB write controller controls a DDR SDRAM write access operation on a 2-MB basis when MBs to be stored in the DDR SDRAM is compressed.

22. The system of claim 15, wherein, the MB read controller includes a video decompressor configured to decompress compressed MB data read out from the DDR SDRAM.

* * * * *